US005766298A

United States Patent [19]
Ashley et al.

[11] Patent Number: 5,766,298
[45] Date of Patent: Jun. 16, 1998

[54] SUPPORT ASSEMBLY FOR CONVEYING GLASS TUBING

[75] Inventors: David L. Ashley; John M. Dafin, both of Painted Post; Michael R. Heslin, Elmira; Jason S. Watts, Horseheads; Paul A. Williams, Elmira, all of N.Y.

[73] Assignee: Corning Incorporated, Corning, N.Y.

[21] Appl. No.: 835,164

[22] Filed: Apr. 7, 1997

Related U.S. Application Data

[62] Division of Ser. No. 598,936, Feb. 9, 1996, Pat. No. 5,688,300.

[51] Int. Cl.[6] .................. C03B 15/14; C03B 13/16; C03B 15/18; C03B 21/00
[52] U.S. Cl. .................. 65/187; 65/370.1; 193/35 R; 193/35 C; 193/37
[58] Field of Search .................. 193/35 R, 35 C, 193/37; 65/187, 370.1, 87

[56] References Cited

U.S. PATENT DOCUMENTS

| | | | |
|---|---|---|---|
| 1,668,634 | 5/1928 | Staffany, Sr. | 193/35 R |
| 2,009,326 | 7/1935 | Sanchez-Vello | 65/187 |
| 2,009,793 | 7/1935 | Sanchez-Vello | 65/187 |
| 3,063,533 | 11/1962 | Cook | 193/35 C |
| 3,278,286 | 10/1966 | Nitsche et al. | 65/187 |
| 4,422,543 | 12/1983 | Stubbings | 193/35 C |
| 5,688,300 | 11/1997 | Ashley et al. | 65/86 |

*Primary Examiner*—Peter Chin
*Assistant Examiner*—Jacqueline A. Ruller
*Attorney, Agent, or Firm*—Milton M. Peterson

[57] ABSTRACT

A runway for conveying glass tubing, as the tubing is drawn from a source of molten glass, embodies support assemblies having rotating sleeves mounted on guide shafts to contact the tubing. A circulating humid atmosphere is maintained in an enclosure during an initial portion of the tube draw to reduce frictive damage to the tubing.

15 Claims, 3 Drawing Sheets

SUPPORT ASSEMBLY FOR CONVEYING GLASS TUBING

This is a division of application Ser. No. 08/598,936, filed Feb. 9, 1996, now U.S. Pat. No. 5,688,300 issued on Nov. 18, 1997.

This application claims the benefit of U.S. Provisional application Ser. No. 60/006,037 filed Oct. 24, 1995, entitled CONVEYING GLASS TUBING, by David L. Ashley, John M. Dafin, Michael R. Heslin, Jason S. Watts and Paul A. Williams.

FIELD OF THE INVENTION

Apparatus for, and method of, conveying glass tubing as the tubing is drawn from a source of molten glass.

BACKGROUND OF THE INVENTION

Various processes are available for drawing a continuous length of glass tubing, either solid or hollow, from a source of molten glass. Two commercially popular processes are the Danner and the Vello processes.

In the Danner process, molten glass is fed continuously to an inclined, rotating, refractory cylinder. The hot glass is drawn from the lower end of the refractory cylinder. A gas, generally air, flows centrally through the refractory into the glass interior. For hollow tubing, sufficient pressure is maintained so that a continuous length of hollow tubing is drawn.

In the Vello process, molten glass flows vertically from a forehearth through an annular space surrounding a hollow refractory needle or pipe through which air may be blown. Air pressure, drawing speed, and glass temperature are adjustable to control the diameter and the wall thickness of the tubing drawn.

In either process, a continuous length of glass tubing is drawn over a horizontal conveyor, sometimes referred to as a tube draw. The tube draw is sufficiently long to permit cooling of the tubing to a temperature at which the tubing can be cut to length without being deformed. The tube draw consists essentially of support rollers, commonly referred to as diablos. Each diablo is a single-piece, V-shaped member that rotates on a shaft held between side rails. Frictive contact between the glass tubing and the diablos provides enough force to overcome the friction between the diablo and the support shaft which does not rotate.

Tubing must be rotated as it is being drawn in order to meet dimensional requirements. Otherwise, it would tend to flatten or collapse. Among the factors relied on to produce such rotation has been frictive contact between the glass and the diablos.

To this end, the side rails are typically offset horizontally. This causes the diablos to rotate at an angle to, rather than parallel with, the path of the tubing. While this non-parallel relationship contributes to driving tube rotation, it also increases the frictive forces at the diablo/glass tubing interface.

The interface where the diablo and the glass tubing contact is typically the site and source of unacceptable scuffs and similar defects resulting from the frictive forces. Heretofore, this problem has been addressed by a shutdown of the draw to replace the rollers. This, of course, is a time consuming operation that results in lost production.

Various alternative conveyor and cooling techniques have been proposed. One such technique supplies air so that the tubing rides on an air cushion. None of these have met general acceptance. As a result, the roller conveyor has remained in use.

It is a purpose of the present invention to provide an improved conveyor system for hot glass tubing. Another purpose is to provide an improved substitute for the traditional, single-piece diablo. A further purpose is to provide an apparatus and method for conveying glass tubing that reduces the frictive forces that cause defects in the tubing. Another purpose is to provide a consistent atmosphere for a tube draw that is independent of seasonal change.

SUMMARY OF THE INVENTION

Our invention resides in part in a roller assembly for supporting glass tubing as the tubing is being drawn from a molten bath, the assembly comprising a central base member, two positioning shafts affixed to the base member, two guide shafts also affixed to the base member, and sleeves that are carried by, and rotate on, the guide shafts. The positioning shafts are affixed to opposite sides of the base member and extend therefrom in opposite directions along a horizontal plane. The guide shafts are also affixed to the base member at points located on opposite sides, but extend therefrom at angles between the vertical central plane of the base member and the horizontal plane of the positioning shafts.

The invention further resides in a method of producing glass tubing which comprises passing the tubing through an enclosure into which air and water are introduced to provide a humid atmosphere that is continuously circulated through the enclosure, drawing the glass tubing over a tube draw within the enclosure, the enclosure extending to a point on the tube draw where the glass has been sufficiently cooled to avoid frictive damage.

BRIEF DESCRIPTION OF THE DRAWINGS

The invention is illustrated in the accompanying drawings wherein.

PRIOR ART

Related patent literature is described in a separate document.

DESCRIPTION OF THE INVENTION

Figure 1:
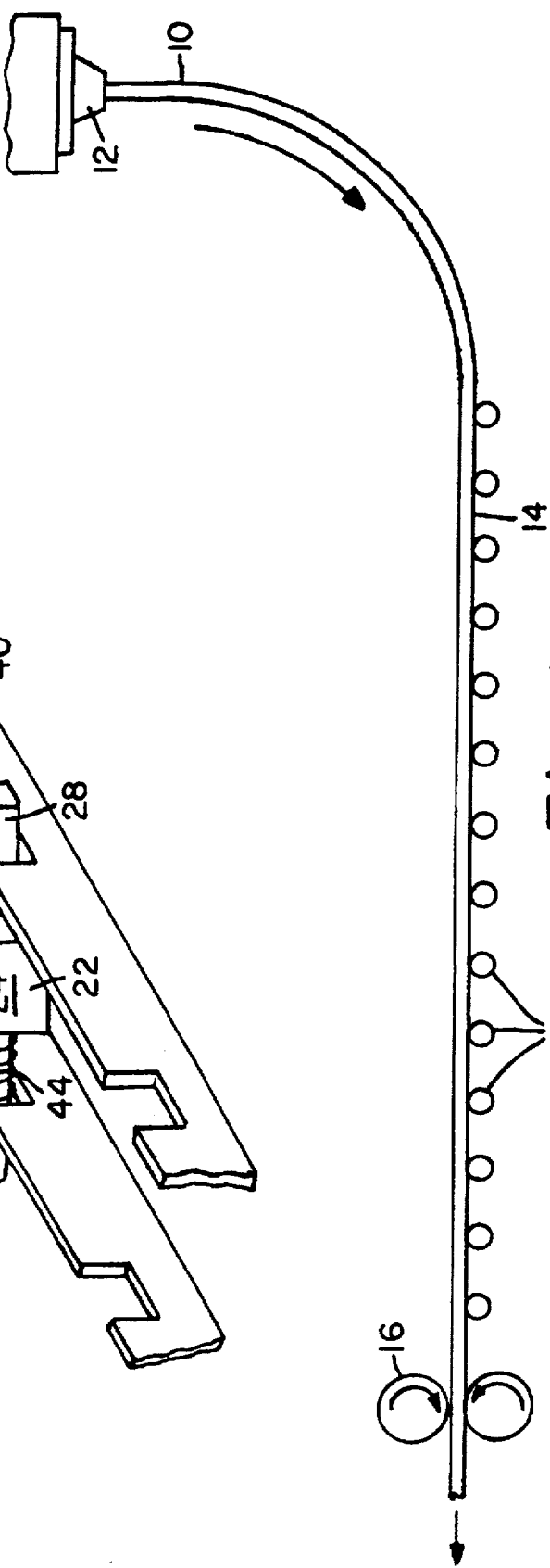
FIG. 1 is a schematic side view of a typical tube drawing apparatus and process.

FIG. 1 is a schematic illustration of a typical Vello process for drawing glass tubing. The FIGURE shows glass tubing 10 being drawn from a source of molten glass through an outlet 12, such as a Vello orifice. As shown, tubing 10 is initially pulled through a catenary, and then horizontally along a tube draw (runway) 14, by traction means 16. Tube draw 14 traditionally has embodied a large number of supporting rollers (diablos) 18 which support the tubing as it is drawn along the horizontal path. Reference is made to U.S. Pat. No. 3,278,286 (Nitsche et al.) for a depiction of the known single-piece rollers as well as a description of the problems associated with their use.

Figure 2:
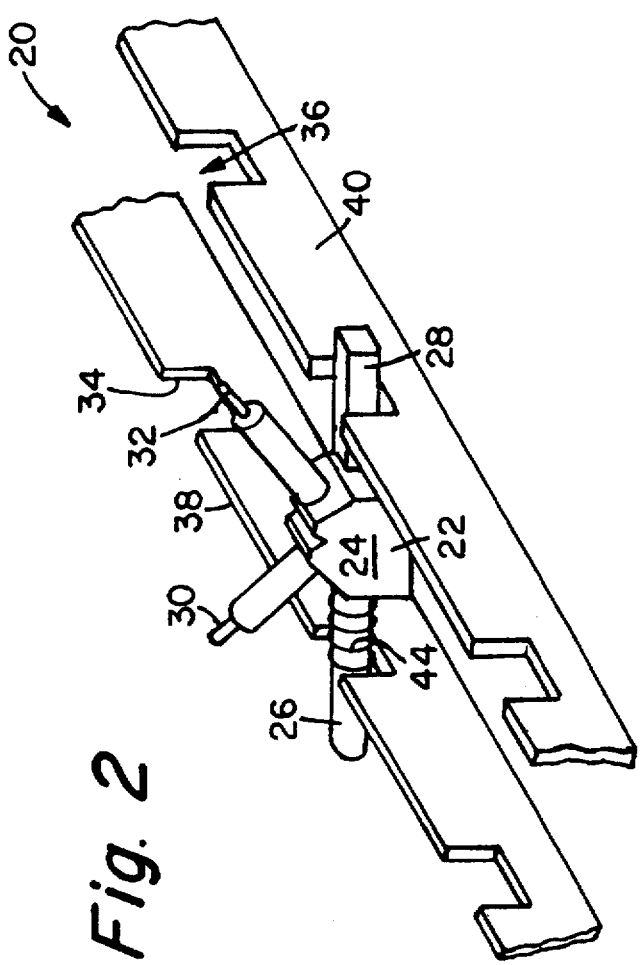
FIG. 2 is an isometric view of a section of a tube drawing apparatus illustrating an improved supporting roller in accordance with the invention.

FIG. 2 is an isometric view, taken at an angle of about 35°, of one section 20 in a conveyor for glass tubing. The FIGURE shows an individual support roller assembly, generally designated 22, that is a preferred embodiment of the present invention.

Figure 3:
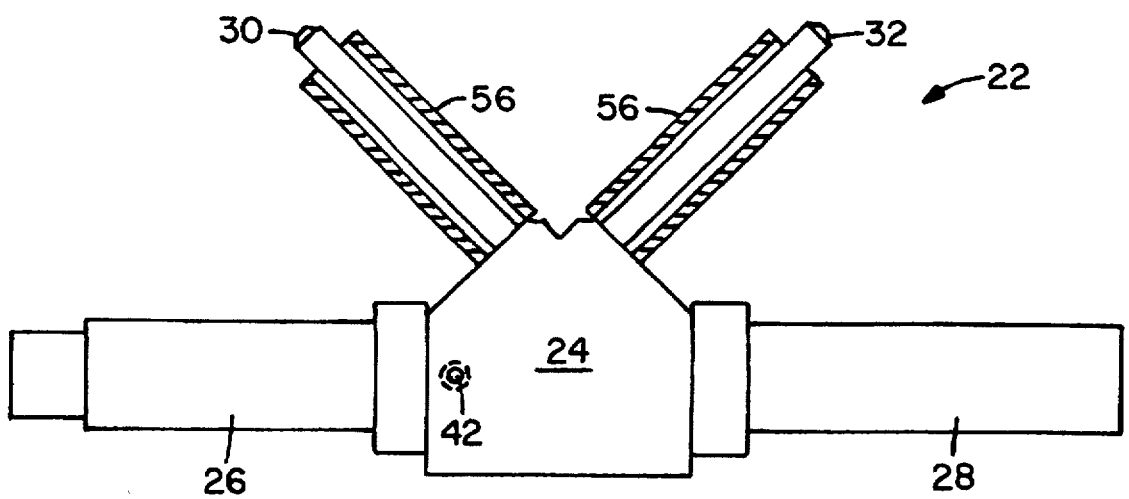
FIG. 3 is a cross-sectional view of the supporting roller of FIG. 2.

FIG. 3 is a front view in cross-section of support roller assembly 22. Support roller assembly 22 comprises a central base member 24, positioning shafts 26 and 28, and guide shafts 30 and 32. Each of the shafts is permanently affixed to body 24 and does not move.

Positioning shafts 26 and 28 rest in slots 34 and 36 in side rails 38 and 40 of a tube draw. Shafts 26 and 28 extend horizontally from opposite sides of base member 24. They have threaded ends which screw into member 24 and are locked in rotational position by set screw 42. Shaft 26 is round in cross-section while shaft 28 is square in cross-section. Shaft 26, and thereby base member 24, are retained and held in alignment by an arrangement 44.

Figure 4:
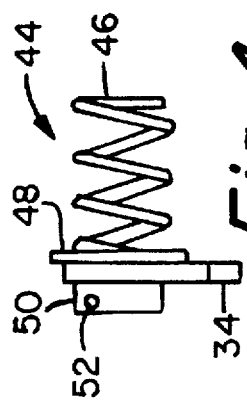
FIG. 4 is an enlarged cross-sectional view of an element in the supporting roller assembly of FIG. 3.

FIG. 4 is a cross-sectional view limited to arrangement 44. Arrangement 44 includes an external spring 46, a washer 48 and a collar 50. Collar 50 is affixed to shaft 26 by a set screw 52. Each of components 46, 48 and 50 have an inside diameter slightly larger than the diameter of shaft 26.

Support roller assembly 22 is installed between side rails 38 and 40 by sliding shafts 26 and 28 vertically into slots 34 and 36. Spring 46 is compressed to fit between the wall of base member 24 and washer 48 inside rail 38. This places assembly 22 under retaining pressure. Collar 50 is positioned outside rail 38 and held in place by set screw 52. By loosening set screw 52, the assembly may be moved horizontally to provide proper alignment. Set screw 52 is then tightened to maintain the aligned position.

Figure 5:
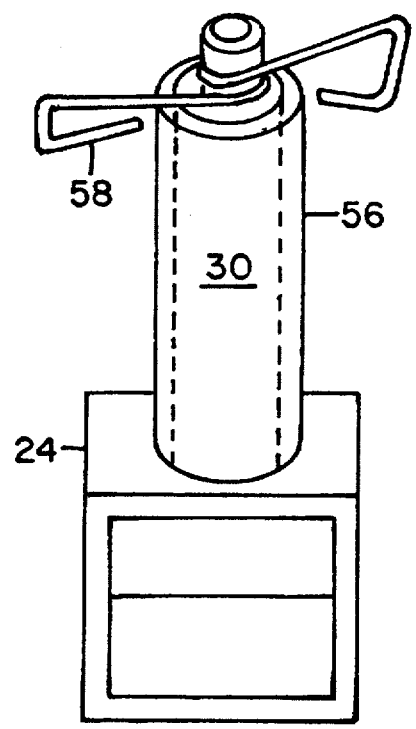
FIG. 5 is an enlarged, cross-sectional view of another element in the supporting roller assembly of FIG. 3.

FIGS. 3 and 5 show the assembly of sleeves 56 on guide shafts 30 and 32. This is a key feature of the present invention. Shaft 30 is selected for illustration in FIG. 5.

Guide shafts 30 and 32 are identical in construction. However, like positioning shafts 26 and 28, they are affixed on opposite sides of base member 24. Shafts 30 and 32 are also threaded on one end allowing them to be screwed into openings in member 24. They may be positioned in a common vertical plane with shafts 26 and 28. However, they extend from base 24 at angles intermediate horizontal and vertical. Usually, this is about a 45° angle whereby they form a 90° angle with each other. However, other separation angles are contemplated, e.g. 120° in one case, depending on the tubing being drawn.

Each of guide shafts 30 and 32 provide support for an independently rotating, cylindrical sleeve 56. Sleeve 56 may be composed of graphite and has a slightly greater internal diameter than the outside diameter of shaft 30. Sleeve 56 slips over shaft 30 and rotates thereon when contacted by tubing being drawn.

FIG. 5 is an enlarged cross-sectional view showing a preferred means for retaining sleeve 56 in position on guide shaft 30. As shown, torsion spring 50 is slipped over the end of guide shaft 30. It lightly contacts the end of sleeve 56 and prevents the sleeve from moving toward the end of shaft 30. Alternatively, the entire roller assembly 22 can be tilted slightly against the moving direction of the tubing being drawn. In this case, the opposing force of the tubing holds sleeve 56 in place.

In operation, a sleeve 56 is placed on each guide shaft 30 and 32. Each sleeve 56 provides an independently rolling interface with the glass tubing. This is the only contact between the tubing and the roller assembly. The independent rotating of sleeves 56 generates a significantly reduced frictive force at the sleeve-tubing interface as compared to prior practice with a single-piece roller.

It will be appreciated that numerous variations in the design of the roller member are possible, and are contemplated within the scope of the invention. For example, roller member 22 might be lengthened. In that design, it may still have one set of positioning shafts, but more than one set of guide shafts mounted on the base member. This enables providing additional tubing support without changing the side rails.

Figure 6:
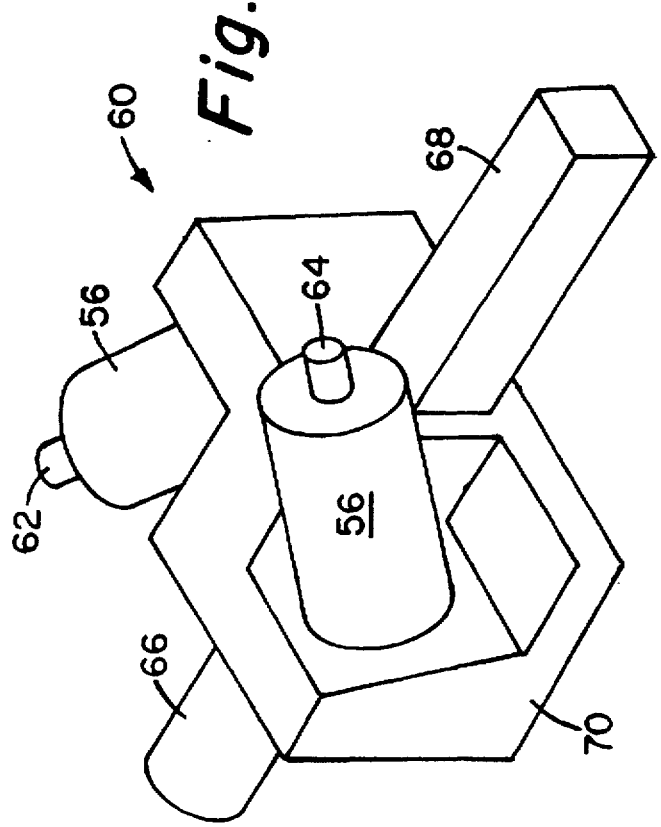
FIG. 6 is an isometric view showing an alternative supporting roller assembly.

FIG. 6 is an isometric view of a roller assembly 60 having offset guide shafts 62 and 64. Shafts 62 and 64 are not in the same vertical plane with each other or with positioning shafts 66 and 68. This design allows rotating sleeves on the guide shafts to be positioned closer to the horizontal center line of assembly 60. The arrangement allows small diameter tubing to be conveyed while being kept safely out of contact with the base member 70.

Figure 7:
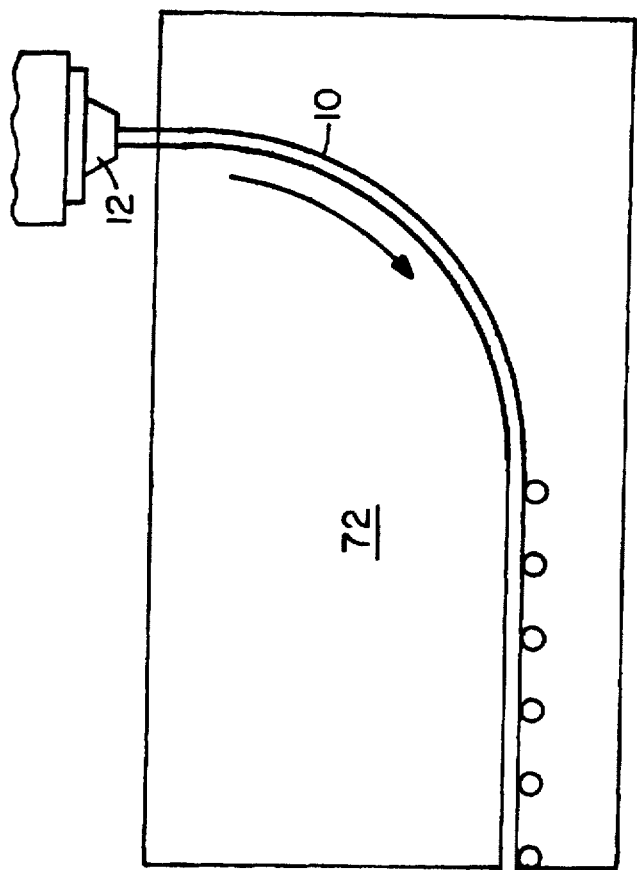
FIG. 7 schematically illustrates a further aspect of the invention.

FIG. 7 is a schematic side view illustrating a further aspect of our process. This aspect involves enclosing the glass tubing in a controlled environment during an initial portion of the tube drawing operation. As shown in FIG. 7, glass tubing 10 is drawn by a suitable Vello process such as from an orifice 12. In the conventional manner shown in FIG. 1, tubing 10 is drawn through a catenary to a horizontal conveyor, such as shown at 14 in FIG. 1. There, it is supported by a plurality of support assemblies 22 as described above.

Tubing 10 is enclosed in an environmentally controlled area 72 from near orifice 12 to a predetermined point on the conveyor. At that point, the glass will have cooled sufficiently to be unaffected by the environment and to no longer be susceptible to frictive damage. This point has been found to be roughly half the length of the conveyor.

One method of practicing this aspect of the invention comprises drawing the glass tubing in a room having a controlled humidity. Should this procedure prove impractical, an alternative practice involves enclosing both the glass tubing 10 and the conveyor in an enclosed area such as illustrated at 72 in FIG. 7. A controlled humidity is maintained within enclosure 72.

This aspect is based on experience showing that frequency of tubing defects follow a pattern of the naturally occurring seasons. Thus, in the northeastern United States, the acceptable product selection has tended to be high in summer and lower in winter. It is known, of course, that humidity varies with the seasons.

It is also known that humid conditions increase the hydroxyl ion concentration on a glass surface. On glass tubing, this tends to lower the surface viscosity at a given temperature. Utilizing this information, it was found that the susceptibility of glass tubing to frictive damage while the tubing is being drawn could be reduced to a minimum. The key was controlling the humidity while the tubing was being fully formed and conditioned. High humidity also serves to lower the coefficient of friction of the surface on the graphite sleeves. This further reduces frictive damage at the glass-graphite interface.

In operation, the conditions of temperature, relative humidity and air flow will vary depending on the actual tube drawing operation, glass temperature and ambient temperature and durability. In general, we have obtained good results by pumping air and water into enclosure 72 at a rate of 7000–7500 scfm of ambient air and 300–400 pounds/hour of water.

The atmosphere within enclosure 72 is exhausted at a somewhat lower rate to maintain a positive pressure within the enclosure and allow for normal leakage. Complete exchange occurs about 20 times/hour. Temperature within enclosure 72 is the result of heat loss from the glass tubing being drawn, and may vary from 75° to 130° F. As indicated earlier, dry ambient air will require a greater moisture addition.

We have found that a remarkable improvement in tubing selection can be obtained by drawing tubing in accordance with the invention. As indicated earlier, rejection numbers as low as 5% were obtained in hot, humid summer weather. These numbers could escalate to as high as 50% in winter. Production tests indicate that rejection rates below 1% for damage on the draw can now be obtained by operating in accordance with the present invention. Optimum benefits are obtained drawing the tubing through a humid atmosphere on a tube draw where the tubing is conveyed by independently rotating sleeves.

In order to provide for tube rotation, a few diablos may be incorporated at the beginning of the draw. There the tubing is sufficiently hot that scuff marks do not occur. Other variations and modifications will be apparent to those familiar with the art.

We claim:

1. A support assembly for glass tubing as the tubing is being drawn from a molten bath, the assembly comprising a central base member with converging, angeled, upper side surfaces and vertical, bottom side surfaces extending downwardly from a bottom edge of said angled, upper side surfaces, two positioning shafts affixed to opposite sides of said vetical, bottom side surfaces of the base member and extending therefrom in opposite directions in a horizontal plane, at least two guide shafts that are affixed to the angled side surfaces of the base member at points located on opposite sides of the base member and extending therefrom at angles between a vertical central plane of the base member and the horizontal plane of the positioning shafts, and sleeves that are carried by, and rotate on, the guide shafts.

2. A support assembly in accordance with claim 1 wherein a first positioning shaft has a circular cross-section and a second positioning shaft has a rectangular cross-section.

3. A support assembly in accordance with claim 1 wherein each of the two guide shafts has a circular cross-section.

4. A support assembly in accordance with claim 1 wherein each sleeve has an inside diameter slightly greater than the outside diameter of the guide shaft.

5. A support assembly in accordance with claim 1 wherein each shaft has a compression spring on the end of the guide shaft to hold the sleeve in position.

6. A support assembly in accordance with claim 1 wherein the guide shafts are positioned at an angle of about 90° with respect to each other.

7. A support assembly in accordance with claim 1 wherein the guide shafts are offset with respect to each other in such a manner that they are not in a common plane.

8. A support assembly in accordance with claim 1 wherein said sleeves that rotate are composed of graphite.

9. A support assembly in accordance with claim 2 wherein the first positioning shaft carries a spring compressed between a vertical bottom side surface side of the base member and a rail to hold the assembly in position.

10. A runway for conveying the advancing glass tubing as the tubing is being drawn from a molten bath, the runway comprising a pair of opposed side rails having opposed slots, a plurality of support assemblies for the tubing, each support assembly comprising a central base member with converging, angled, upper side surfaces and vertical, bottom, side surfaces extending downwardly from a bottom edge of said angled, side upper surfaces two positioning shafts affixed to opposite sides of said vertical, bottom, side surfaces of the base member and extending therefrom in opposite directions in a horizontal plane, at least two guide shafts affixed to the angled, side surfaces of the base member at points that are located on opposite sides of the base member and that extend therefrom at angles between a vertical central plane of the base member and the horizontal plane of the positioning shafts, and sleeves that are carried by, and rotate on, the guide shafts and said positioning shaft positioned and supported in said opposed slots.

11. A runway in accordance with claim 10 wherein a first positioning shaft has a circular cross-section and has a spring compressed between a vertical bottom side surface on the central base member and a side rail.

12. A runway in accordance with claim 10 wherein a first positioning shaft extends beyond the side rail and has an adjustable collar to aid in alignment of the support assembly.

13. A runway in accordance with claim 10 wherein a compression spring is positioned over the end of each guide shaft and against the sleeve thereon to hold the sleeve in position.

14. A runway in accordance with claim 10 wherein at least a portion of the support assemblies are tilted toward the advancing tubing at an angle to a vertical plane to hold the sleeves on the guide shafts in position.

15. A runway in accordance with claim 10 wherein an initial portion of the runway is enclosed and a condition of enhanced humidity is maintained within the enclosure.

* * * * *